United States Patent
Tan et al.

(10) Patent No.: US 8,705,254 B2
(45) Date of Patent: Apr. 22, 2014

(54) SINGLE-PHASE AND THREE-PHASE DUAL BUCK-BOOST/BUCK POWER FACTOR CORRECTION CIRCUITS AND CONTROLLING METHOD THEREOF

(75) Inventors: Jingtao Tan, Shanghai (CN); Zhijian Zhou, Shanghai (CN); Jianping Yang, Shanghai (CN); Wenhui Gou, Shanghai (CN); Jianping Ying, Shanghai (CN)

(73) Assignee: Delta Electronics, Inc. (TW)

( * ) Notice: Subject to any disclaimer, the term of this patent is extended or adjusted under 35 U.S.C. 154(b) by 491 days.

(21) Appl. No.: 12/752,516

(22) Filed: Apr. 1, 2010

(65) Prior Publication Data
US 2010/0253295 A1    Oct. 7, 2010

(30) Foreign Application Priority Data
Apr. 1, 2009    (TW) .................................... 98110954

(51) Int. Cl.
*H02M 7/493* (2007.01)
*H02M 7/487* (2007.01)

(52) U.S. Cl.
USPC .............................. 363/69; 323/207; 323/259

(58) Field of Classification Search
USPC ............. 363/69, 44–48, 89–90, 125, 127, 65, 363/67, 70; 323/207, 259, 344, 260–263, 323/272
See application file for complete search history.

(56) References Cited

U.S. PATENT DOCUMENTS

| | | | | |
|---|---|---|---|---|
| 6,466,466 | B1 * | 10/2002 | Karlsson et al. ................. | 363/44 |
| 6,924,630 | B1 * | 8/2005 | Pacala ............................ | 323/224 |
| 7,276,886 | B2 * | 10/2007 | Kinder et al. .................. | 323/267 |
| 7,402,921 | B2 * | 7/2008 | Ingemi et al. ................... | 307/64 |
| 7,456,524 | B2 * | 11/2008 | Nielsen et al. .................. | 307/82 |
| 8,111,528 | B2 * | 2/2012 | Wu et al. ......................... | 363/37 |
| 2004/0084967 | A1 * | 5/2004 | Nielsen .......................... | 307/66 |
| 2010/0254170 | A1 * | 10/2010 | Wu et al. ........................ | 363/40 |

\* cited by examiner

*Primary Examiner* — Harry Behm
(74) *Attorney, Agent, or Firm* — Volpe and Koenig, P.C.

(57) ABSTRACT

The configurations of a single-phase dual buck-boost/buck power factor correction (PFC) circuit and a controlling method thereof are provided in the present invention. The proposed circuit includes a single-phase three-level buck-boost PFC circuit receiving an input voltage and having a first output terminal, a neutral-point and a second output terminal for outputting a first and a second output voltages, a single-phase three-level buck PFC circuit receiving the input voltage and coupled to the first output terminal, the neutral-point and the second output terminal, a first output capacitor coupled to the first output terminal and the neutral-point, a second output capacitor coupled to the neutral-point and the second output terminal, and a neutral line coupled to the neutral-point.

19 Claims, 5 Drawing Sheets

SINGLE-PHASE AND THREE-PHASE DUAL BUCK-BOOST/BUCK POWER FACTOR CORRECTION CIRCUITS AND CONTROLLING METHOD THEREOF

FIELD OF THE INVENTION

The present invention relates to single-phase/three-phase dual buck-boost/buck power factor correction (PFC) circuits and a controlling method thereof. More particularly, it relates to a single-phase dual buck-boost/buck PFC circuit having a single-phase three-level buck-boost PFC circuit and a single-phase three-level buck PFC circuit, which can be employed to solve the problem that the boost diode of the conventional single-phase dual buck-boost/buck PFC circuit has a relatively higher conduction loss when it is operates under a buck mode, to improve the total harmonic distortion (THD) of a three-phase three-level buck-boost PFC circuit, and to increase an efficiency of the same.

BACKGROUND OF THE INVENTION

In the recent twenty years or so, the power electronic technology has obtained a rapid development, and has been widely applied to the fields of electrical power, chemical engineering and communications. The electrical power apparatus generally receives the electrical power from the grid through the rectifiers. A typical rectifier is a nonlinear circuit including diodes or thyristors. Due to the rectifier, lots of current harmonics and reactive power are generated in the grid, which pollute the grid and become a public nuisance. The electrical power apparatus has become the main harmonic sources of the grid. The active approach is generally used to curb the generation of the harmonics, wherein a new generation of high-performance rectifiers are designed which have the features of sinusoidal input current, low amount of harmonics and high power factor. Recently, the PFC circuits have attained a great development, and become an important research direction of the power electronics.

The boost circuit is one of the most frequently used PFC circuits, which possesses the advantages of simple configuration and small input EMI filter etc., but is only suitable for the occasions where the output voltage is larger than the input voltage. For those application occasions that the input voltage is fluctuating in a wide range, e.g. the input voltage is larger than the output voltage in some occasions; a single stage boost circuit is not suitable. Thus, the PFC circuits having the buck-boost configurations are widely used in the aforementioned occasions, and the input current could quite nicely tracking the input voltage and has a relatively low THD.

FIG. 1 is a circuit diagram of a conventional single-phase three-level buck-boost PFC circuit, which has diodes D1-D2 and D11-D14, switches S11-S14, inductors L11-L12, input power source Vin and output capacitors C1-C2, and outputs a positive voltage +Vo between a first terminal and a neutral point and a negative voltage −Vo between a second terminal and the neutral point, wherein the first terminal is a terminal of C1; the second terminal is a terminal of C2 and the neutral point is the connected terminal of C1 and C2. The output voltages +Vo and −Vo could be any values theoretically.

The upper and lower portions of the circuit as shown in FIG. 1 are fully symmetrical. The diode D1 conducts, a current flows through S11 and the upper half of the circuit operates during the positive half cycle of the input voltage Vin, that is to say, Vin (an instantaneous value) is larger than 0. When the input voltage Vin (the instantaneous value) is smaller than 0 (the negative half cycle of Vin), the diode D2 conducts, the lower half of the circuit operates and a current flows through S12 back to the electrical power network. Thus, the controls of the whole circuit in the positive half-cycle and in the negative half-cycle of the input voltage are respectively independent. For simplicity, the circuit operating in the positive half-cycle is analyzed as an example, and those operating in the negative half-cycle can be analyzed by the same token.

When the input voltage Vin (the instantaneous value) is larger than 0, the circuit of FIG. 1 is equivalent to that shown in FIG. 2, and the operating modes of FIG. 2 are analyzed as follows.

a. $V_o > \sqrt{2} V_{in}$

When the output voltage is larger than the peak value of input voltage ($\sqrt{2} V_{in}$ is the voltage peak value of Vin), the output voltage is always higher than the input voltage which is shown in FIG. 3(a). Under the condition shown in FIG. 3(a), the circuit operates under a boost mode, that is—S11 is on constantly, and D11 is not conducted.

b. $V_o \leq \sqrt{2} V_{in}$

When the output voltage is smaller than the peak value of input voltage, the converter will switch between the buck mode and the boost mode as shown in FIG. 3(b). In FIG. 3(b), the timings when the input voltage intersects the output voltage are $\alpha$ and $\pi-\alpha$ ($0<\alpha<\pi/2$). During the intervals $(0,\alpha)$ and $(\pi-\alpha,\pi)$, the output voltage is large than the input voltage; S11 is on constantly; D11 is off constantly; and the circuit operates under a boost mode. During the interval $(\alpha,\pi-\alpha)$, the output voltage is smaller than the input voltage, S13 is constantly off; D13 is constantly conducted; and the circuit operates under a buck mode.

According to the above-mentioned analysis, D13 is constantly conducted when the circuit operates in the buck mode. Since the forward voltage of D13 is around 1.2 V under the full-loaded condition, the conduction loss consumes of D13 is quite large. When the output voltage is kept constant, the higher the input voltage, the longer the circuit operates in the buck mode, and the larger the conduction loss of D13. Thus the efficiency of the whole system is influenced greatly.

When the input voltage is during its negative half cycle, that is the input voltage is less than 0, the input voltage Vin is boosted when it is larger than the output voltage Vo; and the input voltage is bucked when it is smaller than Vo.

Keeping the drawbacks of the prior arts in mind, and employing experiments and research full-heartily and persistently, the applicant finally conceived single-phase and three-phase dual buck-boost/buck power factor correction circuits and a controlling method thereof.

SUMMARY OF THE INVENTION

It is therefore an object of the present invention to provide single-phase/three-phase dual buck-boost/buck circuits and a controlling method thereof, which can be employed to solve the problem that the boost diode of the conventional single-phase dual buck-boost/buck circuit has a relatively higher conduction loss while operating under a buck mode. The three-phase dual buck-boost/buck circuit comprises three independent single-phase dual buck-boost/buck circuits, and the three single-phase dual buck-boost/buck circuits operate independently without influencing one another since there is a neutral line, which can be used to improve the THD of the three-phase dual buck-boost/buck circuit, and to increase an efficiency of the same. Thus, the three-phase dual buck-boost/buck circuit provided in the present invention has the relatively higher efficiency, raises the power density of the system, and possesses the advantages of separately controlling each of the three phase voltages, and easily realizing the parallelized system etc.

According to the first aspect of the present invention, a dual buck-boost/buck circuit comprises a buck-boost circuit receiving an input voltage and generating a first output voltage between a first output terminal and a neutral-point, and a second output voltage between the neutral-point and a second output terminal, and a buck circuit electrically connected to the first output terminal, the neutral-point and the second output terminal, and receiving the input voltage.

Preferably, the circuit further comprises a first output capacitor connected to the first output terminal and the neutral-point, a second output capacitor connected to the neutral-point and the second output terminal, and a neutral line connected to the neutral-point, wherein the input voltage is an AC voltage, and the first and the second output voltages respectively have a positive and a negative voltage values.

Preferably, the buck-boost circuit is a single-phase three-level buck-boost PFC circuit, and the buck circuit is a single-phase three-level buck PFC circuit.

Preferably, the single-phase three-level buck circuit comprises a rectifying circuit receiving the input voltage, a first buck circuit connected to the rectifying circuit, the first output terminal and the neutral-point, and a second buck circuit connected to the rectifying circuit, the second output terminal and the neutral-point.

Preferably, the single-phase three-level buck-boost circuit further comprises a first to a sixth diodes, each of which has an anode and a cathode, a first to a fourth switches, each of which has a first and a second terminals, wherein the first and the second diodes rectify the input voltage, the anode of the first diode is connected to the cathode of the second diode, and the cathode of the fourth diode is connected to the anode of the third diode, wherein the first and the second terminals of the first switch are connected to the cathodes of the third diode and the first diode respectively, the first and the second terminals of the second switch are coupled to the anodes of the second diode and the fourth diode respectively, the first terminal of the third switch is connected to the cathode of the fourth diode, the second terminal of the third switch is connected to the anode of the fifth diode, the first terminal of the fourth switch is connected to the cathode of the sixth diode, the second terminal of the fourth switch is connected to the first terminal of the third switch, the cathode of the fifth diode is connected to the first output terminal, the anode of the sixth diode is connected to the second output terminal, and the neutral-point is connected to the first terminal of the third switch, and wherein the first and the second terminals of the first inductor are connected to the cathode of the third diode and the second terminal of the third switch respectively, and the first and the second terminals of the second inductor are connected to the anode of the fourth diode and the first terminal of the fourth switch respectively.

Preferably, the rectifying circuit comprises a seventh and a eighth diodes, the first buck circuit comprises a fifth switch, a ninth diode and a third inductor, the second buck circuit comprises a sixth switch, a tenth diode and a fourth inductor, each of the diodes has an anode and a cathode, each of the switches has a first and a second terminals, and each of the inductors has a first and a second terminals, wherein the anode of the seventh diode is connected to the cathode of the eighth diode, the cathode of the tenth diode is connected to the anode of the ninth diode, the first and the second terminals of the fifth switch are connected to the cathodes of the ninth diode and the seventh diode respectively, the first and the second terminals of the sixth switch are connected to the anodes of the eighth diode and the tenth diode respectively, the first and the second terminals of the third inductor are connected to the cathode of the ninth diode and the first output terminal respectively, the first and the second terminals of the fourth inductor are connected to the anode of the tenth diode and the second output terminal respectively, and the neutral-point is connected to the cathode of the tenth diode.

According to the second aspect of the present invention, a three-phase dual buck-boost/buck circuit comprises a first dual buck-boost/buck circuit receiving a first phase voltage of a three-phase voltage, a second dual buck-boost/buck circuit receiving a second phase voltage of the three-phase voltage, and a third dual buck-boost/buck circuit receiving a third phase voltage of the three-phase voltage.

Preferably, the circuit further comprises a first output terminal, a neutral-point, a second output terminal, a first output capacitor connected to the first output terminal and the neutral-point, a second output capacitor connected to the neutral-point and the second output terminal, and a neutral line connected to the neutral-point and a neutral-point of the three-phase voltage.

Preferably, the first dual buck-boost/buck circuit is a first single-phase dual buck-boost/buck circuit and comprises a single-phase three-level buck-boost circuit receiving the first phase voltage and generating a first output voltage between the first output terminal and the neutral-point and a second output voltage between the neutral-point and the second output terminal, and a single-phase three-level buck circuit receiving the first phase voltage and connected to the first output terminal, the neutral-point and the second output terminal, wherein the first and the second output voltages have a positive and a negative values respectively.

Preferably, the second and the third dual buck-boost/buck circuits are two single-phase dual buck-boost/buck circuits, each of which comprises a single-phase three-level buck-boost circuit, and the single-phase three-level buck-boost circuit comprises a first to a sixth diodes, each of which has an anode and a cathode, a first to a fourth switches, each of which has a first and a second terminals, and wherein the first terminal of the first switch is connected to the cathode of the third diode, the second terminal of the first switch is connected to the cathode of the first diode, the first terminal of the second switch is connected to the anode of the second diode, the second terminal of the second switch is connected to the anode of the fourth diode, the first terminal of the third switch is connected to the cathode of the fourth diode, the second terminal of the third switch is connected to the anode of the fifth diode, the first terminal of the fourth switch is connected to the cathode of the sixth diode, the second terminal of the fourth switch is connected to the first terminal of the third switch, the cathode of the fifth diode is connected to the first output terminal, the anode of the sixth diode is connected to the second output terminal and the neutral-point is connected to the first terminal of the third switch, and wherein the first and the second terminals of the first inductor are connected to the cathode of the third diode and the second terminal of the third switch respectively, the first and the second terminals of the second inductor are connected to the anode of the fourth diode and the first terminal of the fourth switch respectively.

Preferably, the second and the third dual buck-boost/buck circuits are two single-phase dual buck-boost/buck circuits, each of which comprises a single-phase three-level buck circuit, and the single-phase three-level buck circuit comprises a first to a fourth diodes, each of which has an anode and a cathode, a first and a second switches, each of which has a first and a second terminals, and a first and a second inductors, each of which has a first and a second terminals, wherein the first and the second diodes rectify one of the first to the third phase voltages, the anode of the first diode is connected to the cathode of the second diode, and the cathode of the fourth diode is connected to the anode of the third diode, and wherein the first and the second terminals of the first switch are connected to the cathodes of the third and the first diodes respectively, the first and the second terminals of the second switch are connected to the anodes of the second and the fourth diodes respectively, the first and the second terminals of the first inductor are connected to the cathode of the third diode and the first output terminal respectively, the first and the second terminals of the second inductor are connected to the anode of the fourth diode and the second output terminal respectively, and the neutral-point is connected to the cathode of the fourth diode.

According to the third aspect of the present invention, a controlling method for a dual buck-boost/buck circuit receiving an input voltage comprises the steps of: boosting the input voltage by the dual buck-boost/buck circuit to generate a first output voltage; and bucking the input voltage by the dual buck-boost/buck circuit to generate the first output voltage.

Preferably, the method further comprises the steps of: boosting the input voltage by the dual buck-boost/buck circuit to generate a second output voltage; and bucking the input voltage by the dual buck-boost/buck circuit to generate the second output voltage.

Preferably, the input voltage is an AC voltage and the input voltage is boosted when it is larger than the second output voltage during a negative half cycle of the input voltage, and the input voltage is bucked when it is smaller than the second output voltage during the negative half cycle of the input voltage.

Preferably, the controlling method for a dual buck-boost/buck circuit receiving an input voltage comprises the steps of: boosting the input voltage by the dual buck-boost/buck circuit to generate a first output voltage; and bucking the input voltage by the dual buck-boost/buck circuit to generate the first output voltage, wherein the input voltage is an AC voltage and the input voltage is boosted when it is smaller than the first output voltage during a positive half cycle of the input voltage, and the input voltage is bucked when it is larger than the first output voltage during the positive half cycle of the input voltage.

According to the fourth aspect of the present invention, a controlling method for a three-phase dual buck-boost/buck circuit, wherein the circuit comprises a first dual buck-boost/buck circuit receiving a first phase voltage of a three-phase voltage, comprises the steps of: boosting the first phase voltage by the first dual buck-boost/buck circuit to generate a first output voltage; and bucking the first phase voltage by the first dual buck-boost/buck circuit to generate the first output voltage.

Preferably, the method further comprises the steps of: boosting the first phase voltage by the first single-phase dual buck-boost/buck circuit to generate a second output voltage; and bucking the first phase voltage by the first single-phase dual buck-boost/buck circuit to generate the second output voltage.

Preferably, the first phase voltage is boosted when it is larger than the second output voltage during a negative half-cycle of the first phase voltage, and the first phase voltage is bucked when it is smaller than the second output voltage during a negative half-cycle of the first phase voltage.

Preferably, the method, wherein the three-phase dual buck-boost/buck circuit further comprises a second dual buck-boost/buck circuit receiving a second phase voltage of the three-phase voltage and a third dual buck-boost/buck circuit receiving a third phase voltage of the three-phase voltage, comprises the steps of: boosting the second and the third phase voltages by the second and the third dual buck-boost/buck circuits to generate the first and a second output voltages respectively; and bucking the second and the third phase voltages by the second and the third dual buck-boost/buck circuits to generate the first and the second output voltages respectively.

Preferably, the controlling method for a three-phase dual buck-boost/buck circuit, wherein the circuit comprises a first dual buck-boost/buck circuit receiving a first phase voltage of a three-phase voltage, comprises the steps of: boosting the first phase voltage by the first dual buck-boost/buck circuit to generate a first output voltage; and bucking the first phase voltage by the first dual buck-boost/buck circuit to generate the first output voltage, wherein the input voltage is an AC voltage and is boosted when it is smaller than the first output voltage during the positive half cycle of the input voltage, and the input voltage is bucked when it is larger than the first output voltage during the positive half cycle of the input voltage.

The present invention may best be understood through the following descriptions with reference to the accompanying drawings, in which:

DETAILED DESCRIPTION OF THE PREFERRED EMBODIMENT

Figure 4:
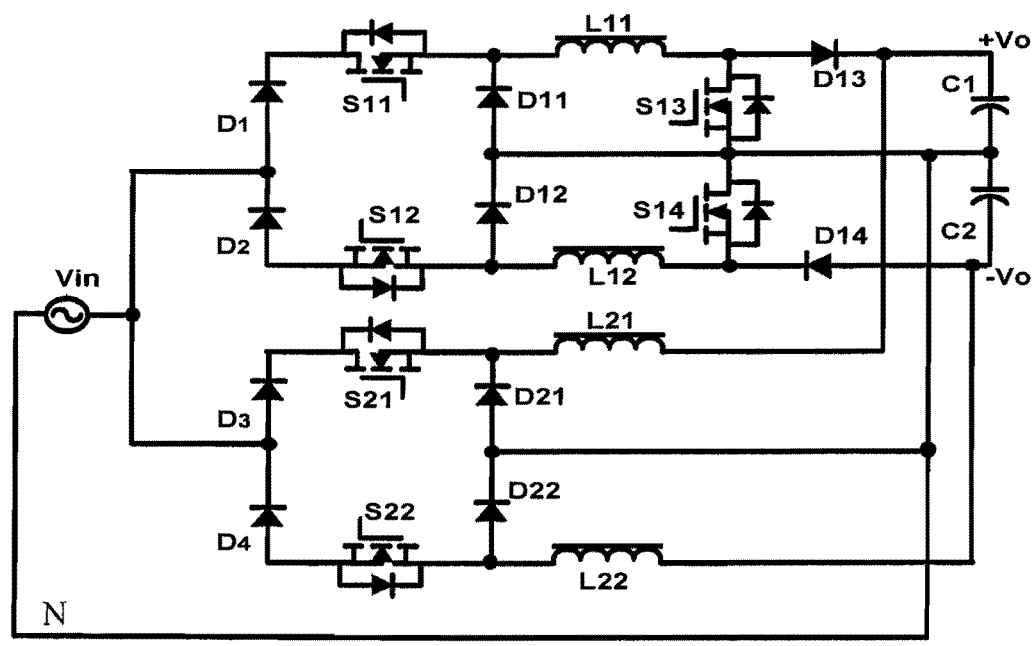
FIG. 4 shows a circuit diagram of a single-phase dual buck-boost/buck circuit according to the first preferred embodiment of the present invention.

To overcome the drawbacks of the conventional buck-boost PFC circuits as aforementioned, an improved topology of the dual buck-boost/buck circuit as shown in FIG. 4 of the present invention is provided. In FIG. 4, the circuit could be viewed as having two portions. The upper half portion is a buck-boost circuit, and the lower half portion is a buck circuit. FIG. 4 has the diodes $D_i$, $D_{j1}$-$D_{j2}$, $D_{13}$-$D_{14}$, the switches $S_{j1}$-$S_{j2}$, $S_{13}$-$S_{14}$, the inductors $L_{j1}$-$L_{j2}$ (in which, $i=1\sim4$, $j=1\sim2$), a first output capacitor C1, a second output capacitor C2 and a neutral line N. The converter in FIG. 4 can be used as a PFC converter.

The first output capacitor C1 connects to a first output terminal and a neutral-point; the second output capacitor C2 connects to the neutral-point and a second output terminal; and the neutral line N connects the neutral point of the input power source Vin (e.g. an AC voltage) and the neutral-point. The dual buck-boost/buck circuit generates its first and second output voltages on its first and second output capacitors respectively, wherein the first output voltage has a positive voltage value (+Vo) and the second output voltage has a negative voltage value (−Vo).

As shown in FIG. 4, the upper half portion is actually a single-phase three-level buck-boost circuit which can be uses as a PFC circuit. And the buck-boost circuit comprises a first to a sixth diodes (D1-D2 and D11-D14), a first to a fourth switches (S11-S14) and a first and a second inductors L11-L12. Each diode has an anode and a cathode; each switch has a first and a second terminal; and each inductor has a first and a second terminal. The first and the second diodes (D1-D2) rectify the input voltage Vin. The anode of the first diode D1 is connected to the cathode of the second diode D2; the cathode of the fourth diode D12 is connected to the anode of the third diode D11; the first and the second terminals of the first switch S11 are connected to the cathodes of the third diode D11 and the first diode D1 respectively; the first and the second terminals of the second switch S12 are connected to the anodes of the second diode D2 and the fourth diode D12 respectively. The first terminal of the third switch S13 is connected to the cathode of the fourth diode D12; the second terminal of the third switch S13 is connected to the anode of the fifth diode D13; the first terminal of the fourth switch S14 is connected to the cathode of the sixth diode D14; the second terminal of the fourth switch S14 is connected to the first terminal of the third switch S13; the cathode of the fifth diode D13 is connected to the first output terminal; the anode of the sixth diode D14 is connected to the second output terminal; the neutral-point is connected to the first terminal of the third switch S13; the first and the second terminals of the first inductor L11 is connected to the cathode of the third diode D11 and the second terminal of the third switch S13 respectively; and the first and the second terminals of the second inductor L12 are connected to the anode of the fourth diode D12 and the first terminal of the fourth switch S14 respectively.

The lower half portion in FIG. 4 is a single-phase three-level buck circuit which can also be used as a PFC circuit. The three-level buck circuit comprises a rectifying circuit receiving the input voltage Vin, a first buck circuit, and a second buck circuit. The buck circuit connects with the buck-boost circuit at the first and the second output terminals and the neutral point. The rectifying circuit comprises a seventh and a eighth diodes (D3-D4) which are connected in series; the first buck circuit comprises a fifth switch S21, a ninth diode D21 and a third inductor L21; and the second buck circuit comprises a sixth switch S22, a tenth diode D22 and a fourth inductor L22. The anode of the seventh diode D3 is connected to the cathode of the eighth diode D4; the cathode of the tenth diode D22 is connected to the anode of the ninth diode D21; the first and the second terminals of the fifth switch S21 are connected to the cathodes of the ninth diode D21 and the seventh diode D3 respectively; the first and the second terminals of the sixth switch S22 are connected to the anodes of the eighth diode D4 and the tenth diode D22 respectively; the first and the second terminals of the third inductor L21 are connected to the cathodes of the ninth diode D21 and the first output terminal respectively; the first and the second terminals of the fourth inductor L22 are connected to the anode of the tenth diode D22 and the second output terminal respectively; and the neutral-point is connected to the cathode of the tenth diode D22.

This improved dual buck-boost/buck circuit adopts a method of controlling the input current under different modes, e.g. the buck mode or the boost mode, corresponding to the input voltage, such that the conduction loss of the boost diode D13 (D14) is dramatically decreased. In the actual applications, elements (e.g. the switches) having smaller rated current than those in the original topology could be employed to decrease the cost of the whole system, meanwhile increase the efficiency and power density of the system.

Figure 5A:
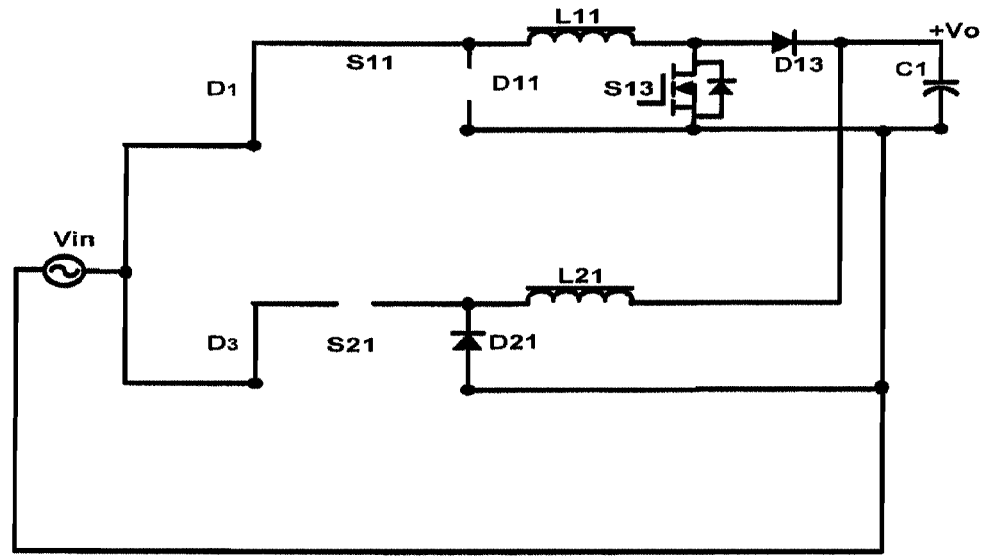
FIG. 5(a) shows an equivalent circuit of the single-phase dual buck-boost/buck circuit as shown in FIG. 4 while operating under a boost mode.
Figure 5B:
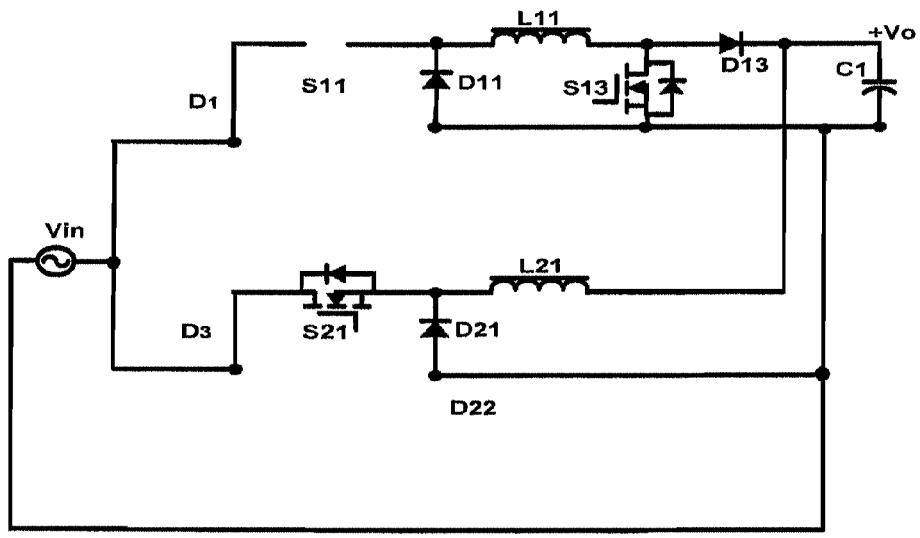
FIG. 5(b) shows an equivalent circuit of the single-phase dual buck-boost/buck circuit as shown in FIG. 4 while operating under a buck mode.

FIG. 5(a) and FIG. 5(b) show the equivalent circuits in FIG. 4 during the positive half cycle of the input voltage (Vin>0).

Figure 3A:
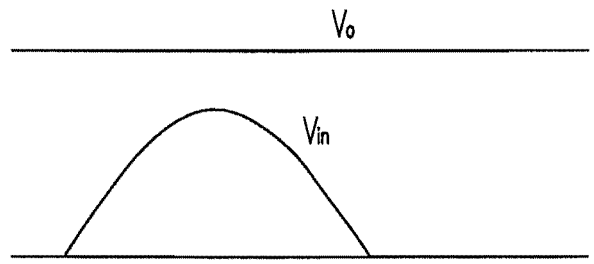
FIG. 3(a) shows a waveform diagram of the input and the output voltages of the single-phase three-level buck-boost circuit as shown in FIG. 1 when the peak value of the input voltage is smaller than the output voltage value.
Figure 3B:
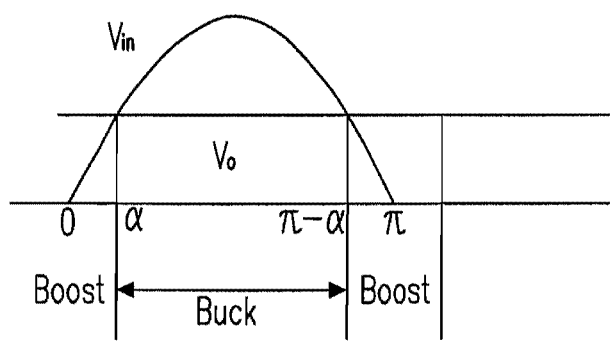
FIG. 3(b) shows a waveform diagram of the input and the output voltages of the single-phase three-level buck-boost circuit as shown in FIG. 1 when the peak value of the input voltage is larger than the output voltage value.

FIG. 5(a) is an equivalent circuit of the single-phase dual buck-boost/buck PFC circuit shown in FIG. 4 when the input voltage is larger than 0 and the circuit operates under a boost mode (e.g. the circuit operates in the intervals (0, α) and (π−α, π) in FIG. 3(b), or under the condition in FIG. 3(a)). Since Vin>0 and $V_o > \sqrt{2} V_{in}$, S11 is constantly on; S21 is constantly off; D1 is conducted; and only S13 switches between on and off states at this time.

Figure 1:
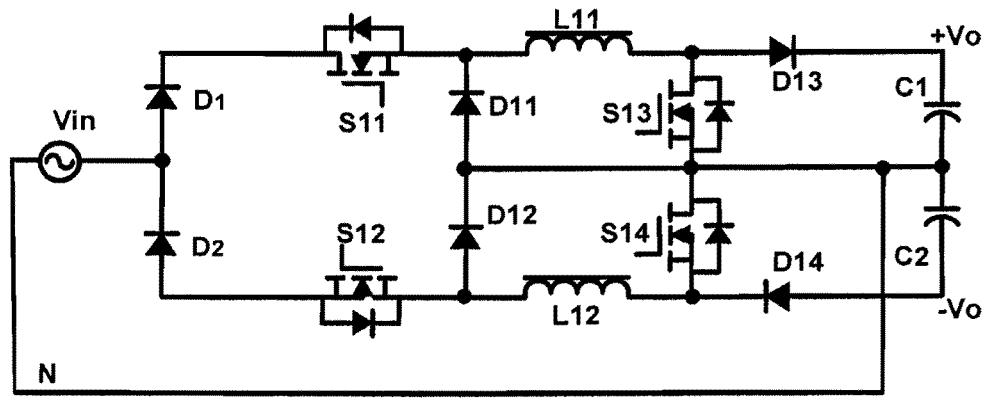
FIG. 1 shows a circuit diagram of a single-phase three-level buck-boost circuit in the prior art.
Figure 2:
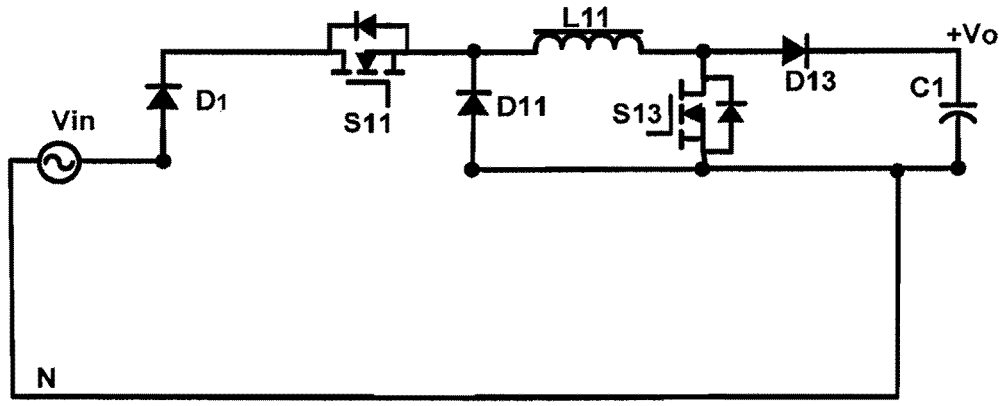
FIG. 2 shows an equivalent circuit of the single-phase three-level buck-boost circuit as shown in FIG. 1 when the input voltage is in a positive half-cycle.

FIG. 5(b) is an equivalent circuit of the single-phase dual buck-boost/buck PFC circuit shown in FIG. 4 when the input voltage is larger than 0 and the circuit operates under a buck mode (e.g. the interval (α, π−α) shown in FIG. 3(b)). Since Vin>0 and $V_o \leq \sqrt{2} V_{in}$, S11 is constantly off; D3 is conducted; and S21 switches between on and off states. Thus, the current does not flow through the diode D13 as shown in FIG. 1 in the buck mode, and the conduction loss on D13 is 0.

By the same token, the operating principles of the circuit during the negative half cycle of the input voltage (Vin≤0) are the same as those during the positive half-cycle. During the negative half cycle, it's the rest elements (D2, S12, D12, L12, S14, D14, C2, D4, S22, D22 and L22) turn to operate, the input voltage Vin is boosted when an amplitude of a negative half-cycle of the input voltage Vin is smaller than the second output voltage (−Vo), and the input voltage is bucked when the amplitude of the negative half-cycle of the input voltage Vin is larger than the second output voltage (−Vo).

Figure 6:
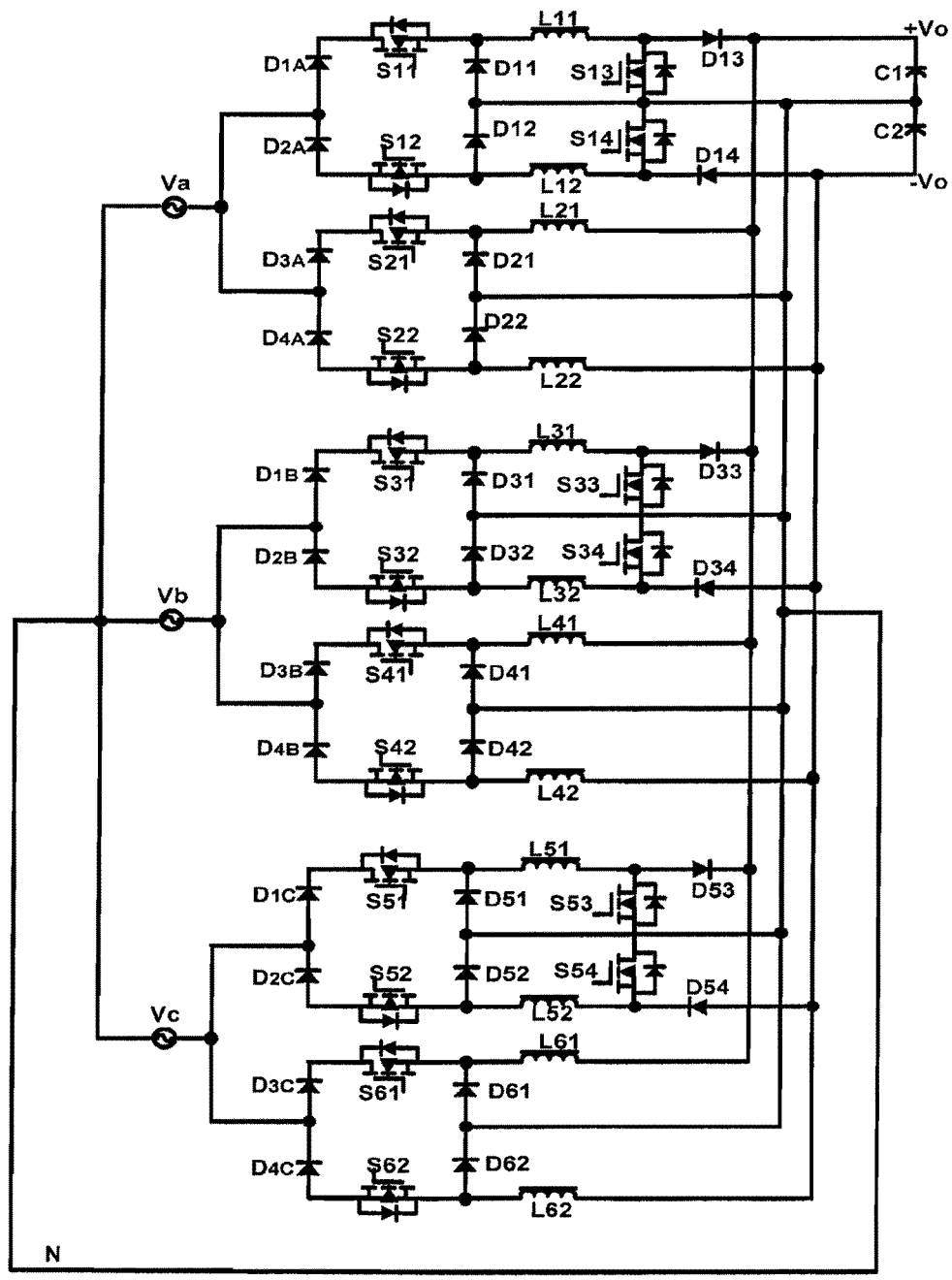
FIG. 6 shows a circuit diagram of a three-phase dual buck-boost/buck circuit according to the second preferred embodiment of the present invention.

FIG. 6 is a circuit diagram of a three-phase dual buck-boost/buck circuit according to the second preferred embodiment of the present invention, wherein the circuit may also be used as a PFC circuit. In FIG. 6, it has diodes DiA, DiB, DiC, Dj1-Dj2 and Dk3-Dk4, switches Sj1-Sj2 and Sk3-Sk4, inductors Lj1-Lj2, wherein i=1~4, j=1~6, and k=1, 3 and 5, capacitors C1-C2 and a neutral line N which connects the neutral point of the power source and the neutral point of the circuit—the connecting node of the capacitors C1-C2. The three-phase dual buck-boost/buck circuit in FIG. 6 can be viewed as three single-phase dual buck-boost/buck circuit, each of which has the same configuration as the circuit shown in FIG. 4. The proposed three-phase dual buck-boost/buck circuit receives a three-phase input voltage, which has a first phase voltage (A phase voltage) Va, a second phase voltage (B phase voltage) Vb, and a third phase voltage (C phase voltage) Vc, and generates a first output voltage +Vo and a second output voltage −Vo.

Since the circuit has the neutral line N, the three single-phase dual buck-boost/buck circuits are independent from one another, which means the first to the third phase voltages of the input voltage could be independently supplied to the three modules (i.e. the three single-phase dual buck-boost/buck circuits). Thus, the controlling method is quite simple, the efficiency of the system is guaranteed to be higher while the THD of the input current is satisfiable at the same time, and the multi-module parallelized control is easy to achieve since the potential of the neutral point is fixed, that is the neutral point voltage of the electrical power network.

According to the aforementioned descriptions, the present invention provides single-phase/three-phase dual buck-boost/buck PFC circuits and a controlling method thereof, which can be employed to solve the problem that the boost diode of the conventional single-phase dual buck-boost/buck PFC circuit has a relatively higher conduction loss while operating under a buck mode. The three-phase dual buck-boost/buck PFC circuit comprises three independent single-phase dual buck-boost/buck PFC circuits, and the three single-phase dual buck-boost/buck PFC circuits operate independently without influencing one another since there is a neutral line, which can be used to improve the THD of the three-phase dual buck-boost/buck PFC circuit, and to increase an efficiency of the same. Thus, the three-phase dual buck-boost/buck PFC circuit provided in the present invention has the relatively higher efficiency, raises the power density of the system, and possesses the advantages of separately controlling each of the three phase voltages, and easily realizing the parallelized system etc., which indeed possesses the non-obviousness and the novelty.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present invention which is defined by the appended claims.

What is claimed is:

1. A three-phase dual buck-boost/buck circuit, comprising:
   a first single-phase dual buck-boost/buck circuit receiving a first phase voltage of a three-phase voltage and including:
      a single-phase three-level buck-boost circuit receiving the first phase voltage and generating a first output voltage between a first output terminal and a neutral-point, and a second output voltage between the neutral-point and a second output terminal; and
      a single-phase three-level buck circuit receiving the first phase voltage and electrically connected to the first output terminal, the neutral-point and the second output terminal,
      wherein the first and the second output voltages have a positive and a negative values respectively.

2. A circuit according to claim 1 further comprising a first output capacitor connected to the first output terminal and the neutral-point, a second output capacitor connected to the neutral-point and the second output terminal, a neutral line connected to the neutral-point, a second single-phase dual buck-boost/buck circuit receiving a second phase voltage of the three-phase voltage and a third single-phase dual buck-boost/buck circuit receiving a third phase voltage of the three-phase voltage.

3. A circuit according to claim 1, wherein the single-phase three-level buck-boost circuit is a single-phase three-level buck-boost PFC circuit, and the single-phase three-level buck circuit is a single-phase three-level buck PFC circuit.

4. A circuit according to claim 3, wherein the single-phase three-level buck PFC circuit comprises:
   a rectifying circuit receiving the first phase voltage;
   a first buck circuit connected to the rectifying circuit, the first output terminal and the neutral-point; and
   a second buck circuit connected to the rectifying circuit, the second output terminal and the neutral-point.

5. A circuit according to claim 4, wherein the rectifying circuit comprises a seventh and a eighth diodes, the first buck circuit comprises a fifth switch, a ninth diode and a third inductor, the second buck circuit comprises a sixth switch, a tenth diode and a fourth inductor, each of the diodes has an anode and a cathode, each of the switches has a first and a second terminals, and each of the inductors has a first and a second terminals,
   wherein the anode of the seventh diode is connected to the cathode of the eighth diode, the cathode of the tenth diode is connected to the anode of the ninth diode, the first and the second terminals of the fifth switch are connected to the cathodes of the ninth diode and the seventh diode respectively, the first and the second terminals of the sixth switch are connected to the anodes of the eighth diode and the tenth diode respectively, the first and the second terminals of the third inductor are connected to the cathode of the ninth diode and the first output terminal respectively, the first and the second terminals of the fourth inductor are connected to the anode of the tenth diode and the second output terminal respectively, and the neutral-point is connected to the cathode of the tenth diode.

6. A circuit according to claim 3, wherein the single-phase three-level buck-boost PFC circuit further comprises:
   a first to a sixth diodes, each of which has an anode and a cathode;
   a first to a fourth switches, each of which has a first and a second terminals; and
   a first and a second inductors, each of which has a first and a second terminals;
   wherein the first and the second diodes rectify the first phase voltage; the anode of the first diode is connected to the cathode of the second diode, and the cathode of the fourth diode is connected to the anode of the third diode;
   wherein the first and the second terminals of the first switch are connected to the cathodes of the third diode and the first diode respectively; the first and the second terminals of the second switch are connected to the anodes of the second diode and the fourth diode respectively; the first terminal of the third switch is connected to the cathode of the fourth diode; the second terminal of the third switch is connected to the anode of the fifth diode; the first terminal of the fourth switch is connected to the cathode of the sixth diode; the second terminal of the fourth switch is connected to the first terminal of the third switch; the cathode of the fifth diode is connected to the first output terminal; the anode of the sixth diode is connected to the second output terminal; and the neutral-point is connected to the first terminal of the third switch; and
   wherein the first and the second terminals of the first inductor are connected to the cathode of the third diode and the second terminal of the third switch respectively; and the first and the second terminals of the second inductor are connected to the anode of the fourth diode and the first terminal of the fourth switch respectively.

7. A controlling method for a three-phase dual buck-boost/buck circuit, including a first single-phase dual buck-boost/buck circuit receiving a first phase voltage of a three-phase voltage, comprising the steps of:
   boosting the first phase voltage by the first single-phase dual buck-boost/buck circuit to generate a first output voltage; and bucking the first phase voltage by the first single-phase dual buck-boost/buck circuit to generate the first output voltage, wherein the first phase voltage is boosted when it is smaller than the first output voltage during a positive half cycle of the first phase voltage, the first phase voltage is bucked when it is larger than the first output voltage during the positive half cycle of the first phase voltage, and the first single-phase dual buck-boost/buck circuit is the first single-phase dual buck-boost/buck circuit as claimed in claim 1.

8. A controlling method for a three-phase dual buck-boost/buck circuit, wherein the circuit comprises a first single-phase dual buck-boost/buck circuit receiving a first phase voltage of a three-phase voltage, comprising the steps of:

boosting the first phase voltage by the first single-phase dual buck-boost/buck circuit to generate a first output voltage; and bucking the first phase voltage by the first single-phase dual buck-boost/buck circuit to generate the first output voltage, wherein the first phase voltage is boosted when it is smaller than the first output voltage during the positive half cycle of the first phase voltage; the first phase voltage is bucked when it is larger than the first output voltage during the positive half cycle of the first phase voltage, and the first single-phase dual buck-boost/buck circuit is the first single-phase dual buck-boost/buck circuit as claimed in claim 1.

9. A three-phase dual buck-boost/buck circuit, comprising:
a first output terminal;
a second output terminal;
a neutral-point;
a first dual buck-boost/buck circuit being a first single-phase dual buck-boost/buck circuit, receiving a first phase voltage of a three-phase voltage and including:
a single-phase three-level buck-boost circuit receiving the first phase voltage and generating a first output voltage between the first output terminal and the neutral-point and a second output voltage between the neutral-point and the second output terminal; and
a single-phase three-level buck circuit receiving the first phase voltage and connected to the first output terminal, the neutral-point and the second output terminal,
wherein the first and the second output voltages have a positive and a negative values respectively;
a second dual buck-boost/buck circuit receiving a second phase voltage of the three-phase voltage; and
a third dual buck-boost/buck circuit receiving a third phase voltage of the three-phase voltage.

10. A circuit according to claim 9 further comprising a first output capacitor connected to the first output terminal and the neutral-point, a second output capacitor connected to the neutral-point and the second output terminal, and a neutral line connected to the neutral-point and a neutral-point of the three-phase voltage.

11. A circuit according to claim 10, wherein the second and the third dual buck-boost/buck circuits are two single-phase dual buck-boost/buck circuits, each of which comprises a single-phase three-level buck-boost circuit, and the single-phase three-level buck-boost circuit comprises:
a first to a sixth diodes, each of which has an anode and a cathode;
a first to a fourth switches, each of which has a first and a second terminals; and
a first and a second inductors, each of which has a first and a second terminals, wherein the first and the second diodes rectify one of the first to the third phase voltages, the anode of the first diode is connected to the cathode of the second diode, and the cathode of the fourth diode is connected to the anode of the third diode;

wherein the first and the second terminals of the first switch are connected to the cathodes of the third and the first diodes respectively, the first and the second terminals of the second switch are connected to the anode of the second and the fourth diodes respectively, the first and the second terminals of the third switch are connected to the cathode of the fourth diode and the anode of the fifth diode respectively, the first and the second terminals of the fourth switch are connected to the cathode of the sixth diode and the first terminal of the third switch respectively, the cathode of the fifth diode is connected to the first output terminal, the anode of the sixth diode is connected to the second output terminal and the neutral-point is connected to the first terminal of the third switch; and wherein the first and the second terminals of the first inductor are connected to the cathode of the third diode and the second terminal of the third switch respectively, the first and the second terminals of the second inductor are connected to the anode of the fourth diode and the first terminal of the fourth switch respectively.

12. A circuit according to claim 10, wherein the second and the third dual buck-boost/buck circuits are two single-phase dual buck-boost/buck circuits, each of which comprises a single-phase three-level buck circuit, and the single-phase three-level buck circuit comprises
a first to a fourth diodes, each of which has an anode and a cathode;
a first and a second switches, each of which has a first and a second terminals; and
a first and a second inductors, each of which has a first and a second terminals, wherein the first and the second diodes rectify one of the first to the third phase voltages, the anode of the first diode is connected to the cathode of the second diode, and the cathode of the fourth diode is connected to the anode of the third diode; and wherein the first and the second terminals of the first switch are connected to the cathodes of the third and the first diodes respectively; the first and the second terminals of the second switch are connected to the anodes of the second and the fourth diodes respectively; the first and the second terminals of the first inductor are connected to the cathode of the third diode and the first output terminal respectively; the first and the second terminals of the second inductor are connected to the anode of the fourth diode and the second output terminal respectively; and the neutral-point is connected to the cathode of the fourth diode.

13. A controlling method for a three-phase dual buck-boost/buck circuit, including a first single-phase dual buck-boost/buck circuit with a single-phase three-level buck-boost circuit receiving a first phase voltage of a three-phase voltage and a single-phase three-level buck circuit receiving the first phase voltage and electrically connected to a first output terminal, a neutral-point and a second output terminal, comprising the steps of:

boosting the first phase voltage by the first single-phase dual buck-boost/buck circuit to generate a first output voltage between the first output terminal and the neutral-point; and bucking the first phase voltage by the first single-phase dual buck-boost/buck circuit to generate the first output voltage between the first output terminal and the neutral-point.

14. A method according to claim 13, further comprising the steps of:
boosting the first phase voltage by the first single-phase dual buck-boost/buck circuit to generate a second output voltage; and
bucking the first phase voltage by the first single-phase dual buck-boost/buck circuit to generate the second output voltage.

15. A method according to claim 14, wherein the first phase voltage is boosted when it is larger than the second output voltage during a negative half cycle of the first phase voltage, and the first phase voltage is bucked when it is smaller than the second output voltage during the negative half cycle of the first phase voltage.

16. A controlling method for a three-phase dual buck-boost/buck circuit, wherein the circuit comprises a first single-phase dual buck-boost/buck circuit including a single-phase three-level buck-boost circuit receiving a first phase voltage of a three-phase voltage and a single-phase three-level buck circuit receiving the first phase voltage and electrically connected to a first output terminal, a neutral-point and a second output terminal, comprising the steps of:
boosting the first phase voltage by the single-phase three level buck-boost circuit to generate a first output voltage; and
bucking the first phase voltage by the single-phase three level buck circuit to generate the first output voltage.

17. A method according to claim 16, further comprising the steps of:
boosting the first phase voltage by the first single-phase dual buck-boost/buck circuit to generate a second output voltage; and
bucking the first phase voltage by the first single-phase dual buck-boost/buck circuit to generate the second output voltage.

18. A method according to claim 17, wherein the first phase voltage is boosted when it is larger than the second output voltage during a negative half-cycle of the first phase voltage, and the first phase voltage is bucked when it is smaller than the second output voltage during a negative half-cycle of the first phase voltage.

19. A method according to claim 16, wherein the three-phase dual buck-boost/buck circuit further comprises a second single-phase dual buck-boost/buck circuit receiving a second phase voltage of the three-phase voltage and a third single-phase dual buck-boost/buck circuit receiving a third phase voltage of the three-phase voltage, comprising the steps of:
boosting the second and the third phase voltages by the second and the third single-phase dual buck-boost/buck circuits to generate the first and a second output voltages respectively; and
bucking the second and the third phase voltages by the second and the third single-phase dual buck-boost/buck circuits to generate the first and the second output voltages respectively.

\* \* \* \* \*